May 18, 1937.  A. BECKELMAN  2,080,997
KNOCK-DOWN DISPLAY DEVICE
Filed Feb. 24, 1937  4 Sheets-Sheet 1

INVENTOR,
Abraham Beckelman,
BY Frederick Breitenfeld
ATTORNEY.

May 18, 1937.  A. BECKELMAN  2,080,997
KNOCK-DOWN DISPLAY DEVICE
Filed Feb. 24, 1937   4 Sheets-Sheet 2
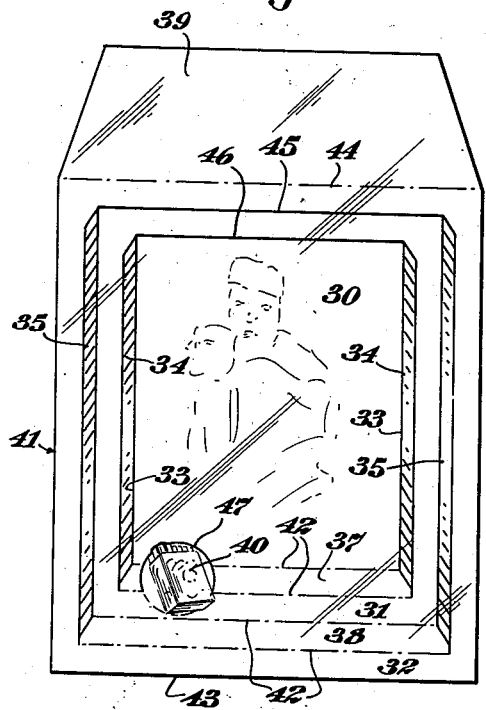
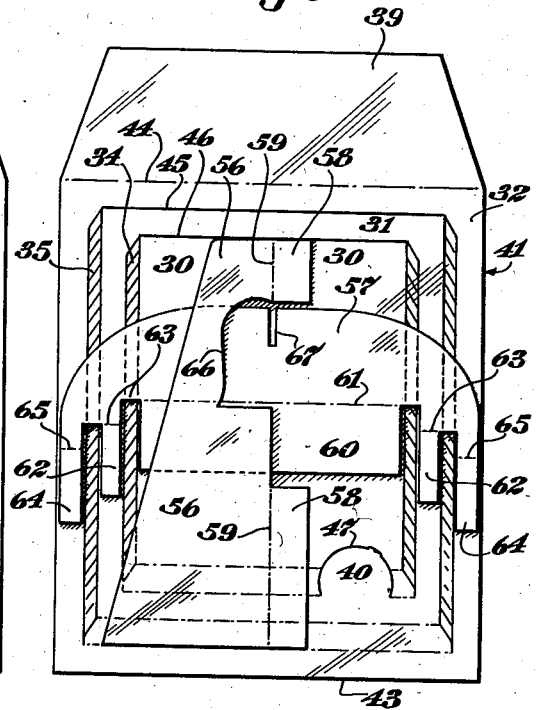
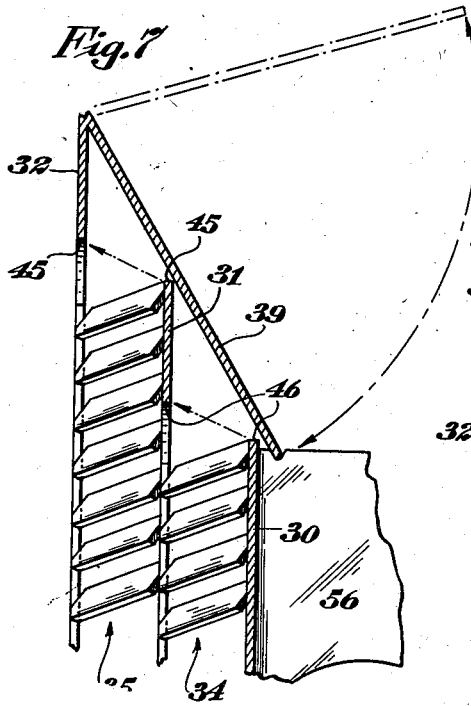
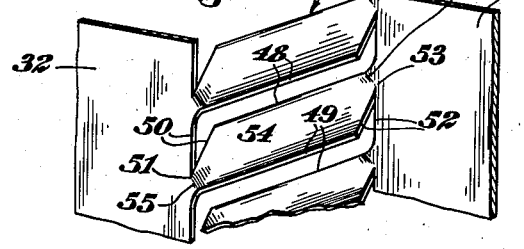
INVENTOR,
Abraham Beckelman,
BY Frederick Greitenfeld
ATTORNEY.

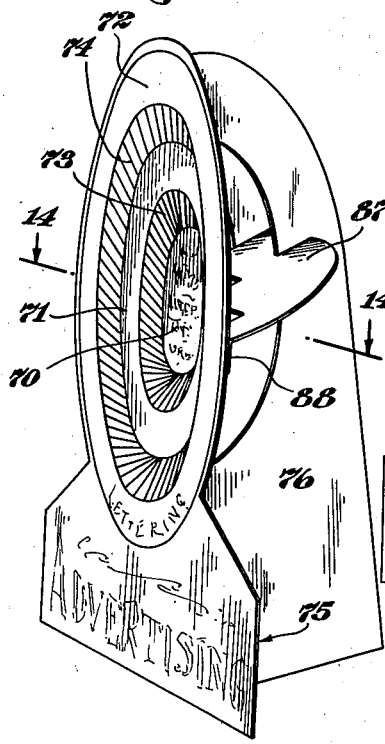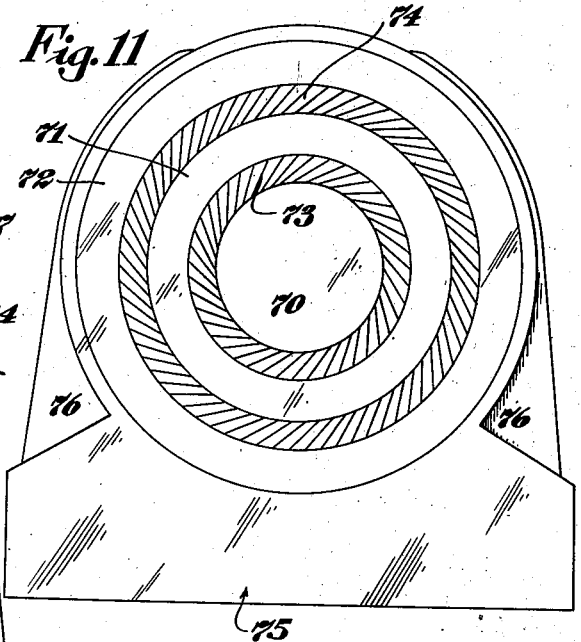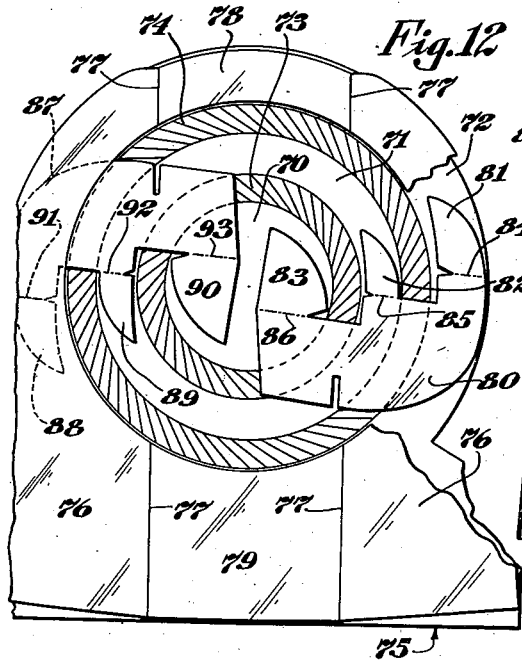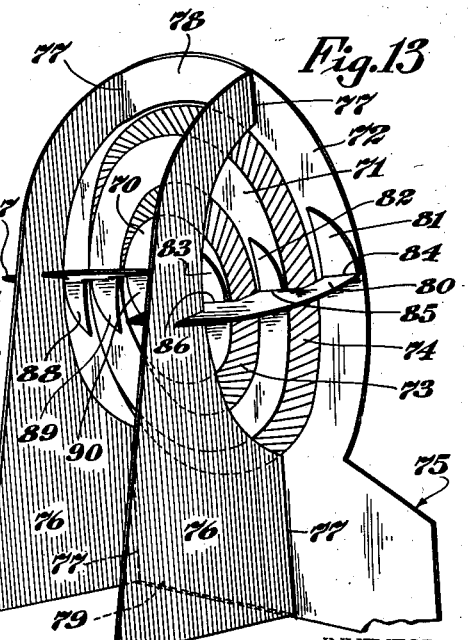

May 18, 1937.  A. BECKELMAN  2,080,997
KNOCK-DOWN DISPLAY DEVICE
Filed Feb. 24, 1937  4 Sheets-Sheet 4
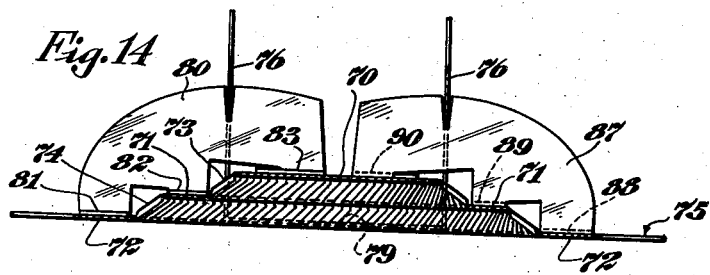
INVENTOR,
Abraham Beckelman,
BY Frederick Breitenfeld
ATTORNEY.

Patented May 18, 1937

2,080,997

UNITED STATES PATENT OFFICE 2,080,997

KNOCK-DOWN DISPLAY DEVICE

Abraham Beckelman, New York, N. Y.

Application February 24, 1937, Serial No. 127,374

18 Claims. (Cl. 40—126)

My present invention relates generally to display devices, and has particular reference to an improved type of knock-down advertising display or the like.

It is a principal object of my invention to provide an improved device which may be constructed at relatively low expense from elements of cardboard, stiff paper, or the like; although it will be understood that certain phases of my invention do not necessarily restrict its use to cardboard or its equivalents. From its broader aspects, my invention may be resorted to in manufacturing a display device of any convenient, normally flat blank or blanks of bendable sheet material.

One of the main features of my invention lies in the ability to construct a multi-tier display with a minimum number of initial flat blanks. In fact, the main portion of the present display device may be composed in its entirety from a single integral blank of bendable sheet material, such as cardboard. It is this feature of the invention which permits its use in the construction of so-called "knock-down" displays, i. e., displays which may be packed, shipped, and stored in substantially flat condition.

A device of the present character, when set up, comprises an ornamental portion in which at least two areas are arranged in offset, substantially parallel planes. For example, one of these areas might constitute a main display area or panel, while the other area may constitute an ornamental border or similar area of contrast.

The preferred embodiments, illustrated and described herein, and which strikingly exemplify the varied possibilities of construction and arrangement of displays, employ three areas arranged in three mutually offset planes. In each case, one of the areas is a medial display area or panel, and the other two areas are ornamental borders.

The characterizing feature of my present invention lies in the provision of a slitted panel between two unslitted areas, the slitted panel being divided into a series of louvers by means of a series of slits of particular character, whereby the unslitted areas are susceptible to a relative shifting movement bringing them into offset planes, the louvers at the same time assuming spaced positions in offset, oblique planes.

In one of the embodiments here in illustrated, the main display area is substantially rectangular, and a pair of slitted panels is arranged along each of two opposed sides of the rectangle. With this arrangement, the unslitted areas, one of which may be a border, are adapted to be shifted, relative to each other, in a direction parallel to said sides.

In another embodiment herein illustrated, the main display area is substantially circular; another unslitted area serves as an ornamental circular border; and a circular, slitted panel is arranged between these areas.

Other features of my invention reside in the novel arrangement of a prop blank for supporting the device in upright position, and the provision of a special type of bracing blank which serves to hold the areas in the offset relationship. More particularly, it is a feature of my invention to provide a bracing blank having hinged flaps secured to the unslitted areas, respectively, the hinge axes being offset one from the other, whereby the act of setting up the device and bracing it serves automatically to bring and retain the areas into proper offset relationship.

A particular feature of my invention lies in the special arrangement of slits for effecting the purposes hereinbefore alluded to. Preferably, each slit is a zigzag, the ends of each slit lying closely adjacent to midportions of the adjacent slits, respectively. The result is that the louvers are of appreciable size and of selected ornamental contour, and are secured in position only at opposed, relatively small, readily bendable areas.

Other features of my invention contributing toward the creation of a practical, economical, and highly attractive display structure will be set forth hereinafter.

I achieve the foregoing objects, and such other objects as may hereinafter appear or be pointed out, in the manner illustratively exemplified in the accompanying drawings, wherein—

Figure 5 is a front elevational view of the device of Figure 1 in collapsed condition;

Figure 6 is a rear view of Figure 5;

Figure 7 is an enlarged cross-sectional view taken substantially along the line 7—7 of Figure 1;

Figure 8 is a fragmentary enlarged view of the slits and louvers entering into the device of Figure 1;

Figure 9 is a fragmentary perspective view showing the louvers of Figure 8 in operative relationship;

Figure 10 is a perspective view of a modified display structure embodying the features of the present invention;

Figure 11 is a front elevational view of the device of Figure 10 in collapsed condition;

Figure 12 is a rear view of Figure 11, with certain parts broken away for the sake of clearness;

Figure 13 is a perspective view of the device of Figure 10, as seen from the rear;

Figure 14 is a plan view taken substantially along the line 14—14 of Figure 10;

Figure 15 is a view similar to Figure 14, illustrating a modification;

Figures 16 and 17 are views similar to Figures 8 and 9, illustrating a modified type of slit and louver;

Figures 18 and 19 are views similar to Figures 16 and 17, illustrating a further modification in the slit and louver design; and Figures 20 and 21 are views similar to Figures 16 and 17, illustrating a further modification in the slit and louver design.

Figure 1:
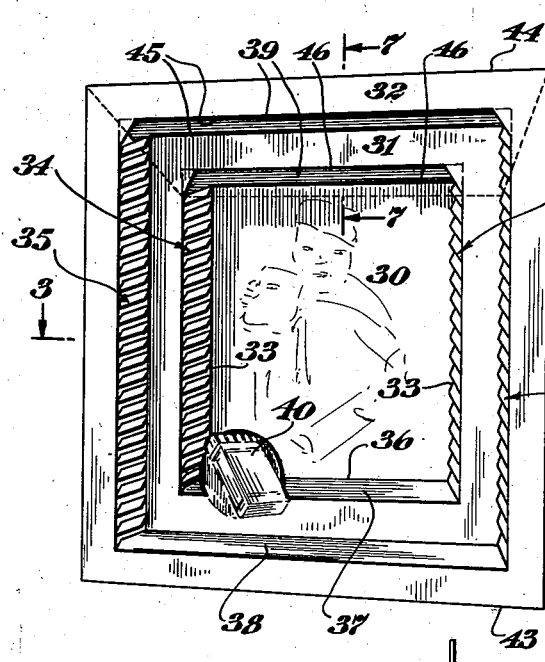
Figure 1 is a perspective view, from the front, of a display device constructed in accordance with the present invention.
Figure 2:
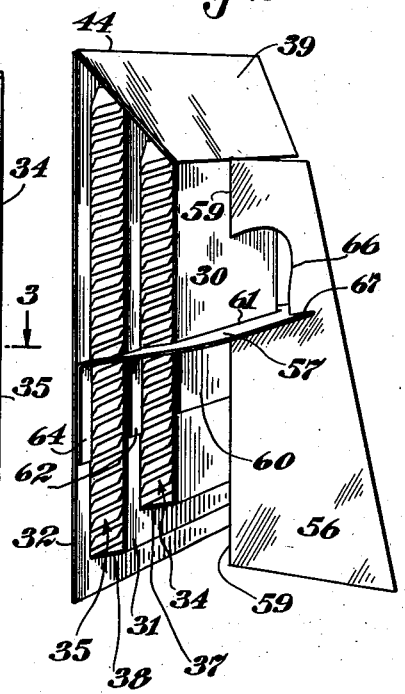
Figure 2 is a perspective view of the same device as seen from the rear.

Referring first to Figures 1 and 2, it will be observed that I have, for illustrative purposes, shown a substantially rectangular display device in which there is a substantially rectangular, medial display area 30. Surrounding this area is a rectangular border area 31 lying in a plane substantially parallel to the area 30 but offset toward the front. Surrounding the inner border 31 is a substantially rectangular outer border 32 arranged, similarly, in a parallel plane, but further offset toward the front.

Between the opposite parallel sides 33 of the area 30 and the corresponding portions of the border area 31 are the slitted panels 34, the details of which will be hereinafter more fully described. Similarly, between the corresponding side portions of the border areas 31 and 32 there are similar slitted panels 35.

Between the bottom edge 36 of the area 30 and the corresponding portion of the border area 31 there is an unslitted panel 37; and between the lower portions of the areas 31 and 32 there is a similar unslitted panel 38. Portions of a cover element or panel 39 complete the front view of the device.

Merely for illustrative purposes I have shown an auxiliary display projection 40 integrally formed on the border area 31, but this projection forms no essential part of the present invention.

Before describing how the device is set up and retained in such condition, reference will be made to Figure 5 in which I show how the elements thus far described are integral portions of a single initial blank of sheet material.

A blank 41 having the approximate contour shown is crease-scored along the parallel lines 42, parallel to the bottom edge 43 of the blank, thereby defining what will ultimately be the panels 37 and 38 and the lower portions of the border areas 31 and 32. The blank is also crease-scored along the line 44, thereby defining the hinged flap or panel 39. Along the lines 45 and 46, parallel to the line 44, the blank is cut through. The line 45 defines the lower edge of the upper portion of the area 32, and the upper edge of the upper portion of the area 31 (see Figure 1). The line 46 defines the lower edge of the upper portion of the area 31, and the upper edge of the medial display area 30 (see Figure 1).

By cutting through the blank along the curved line 47, the projection 40 is provided for.

The panels 34 and 35 are slitted in the manner shown most clearly in Figure 8. Since each panel is slit in the same way, and produces louvers of the same type and configuration, the description will be limited to the panel 35, and it may be assumed that Figure 9 is an enlarged fragmentary view of this panel in set-up condition.

A series of zigzag, diagonal slits are made in the blank in spaced relationship, each slit extending transversely across the panel. In the embodiment of Figures 1, 8, and 9, the zigzag of each slit is rectilinear in character, i. e., the three portions of each slit are formed by straight lines. Reference to two adjacent slits will be sufficient to explain the nature of the construction. Thus, the slit portion 48 is parallel to the corresponding adjacent slit portion 49. At the end of the portion 48 the slit extends, as at 50, to a point 51 closely adjacent to a midportion of the slit 49. The other end of the slit is correspondingly formed, as is shown by the fact that the upper portion 52 of the slit 49 terminates at a point 53 closely adjacent to a midportion of the slit 48. The result is that a parallelogrammic louver 54 is produced, the same being secured to the areas 31 and 32 only at the opposite corner areas 55. These areas are relatively small and hence readily bendable. Accordingly, when the area 31 is shifted with respect to the area 32, in a direction parallel to the entire panel 35, the parts automatically assume the relationship of Figure 9 in which, it will be observed, the area 31 has moved rearwardly and downwardly with respect to the area 32. This arranges the areas 31 and 32 in the offset planes hereinbefore mentioned. It also automatically adjusts the louvers into the spaced, superposed relationship shown in Figure 9, these louvers being thus in positions which are spaced apart and in oblique, offset planes.

It will be understood that the inclination of the diagonal slits in the right-hand panels 34 and 35 (as viewed in Figures 1 and 5) is opposite to that shown at the left in these figures and in Figures 8 and 9.

Figure 4:
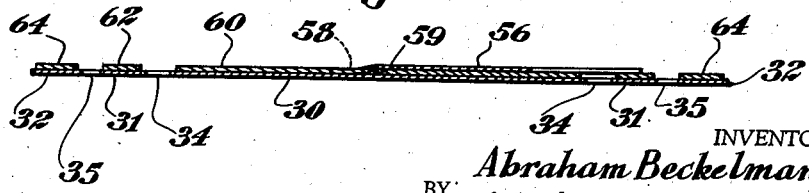
Figure 4 is a view similar to Figure 3 and showing the device in collapsed or knocked-down condition.

To effect this shifting movement in an efficient and reliable manner, and to retain the parts in set-up condition, I provide a prop blank 56 (see Figure 6) and a bracing blank 57, each of which is preferably formed of a single blank of suitable sheet material, such as cardboard. The blank 56 is adhesively secured, as at 58, to the back of the medial area or panel 30; and it is provided with a vertical score line 59 to permit it to be swung into the position shown in Figure 2, whereby it lies in a plane transverse to the area 30, thereby supporting the entire device in an upright position. When the device is to be collapsed, the blank 56 lies flat, as shown in Figures 4 and 6.

The blank 57 has a flap 60 hinged to it along the line 61, a pair of flaps 62 hinged along the lines 63, and a pair of flaps 64 hinged along the lines 65. The flap 60 is adhesively secured to the back of the area 30; the flaps 62 are adhesively secured to the back of the area 31; and the flaps 64 are adhesively secured to the back of the area 32. It will be observed that the hinge axes 61, 63, and 65 are offset from one another. This is purposely done, in accordance with my invention, so that when the blank 57 is swung from the collapsed position of Figure 6 into the operative position of Figures 2 and 3, the areas 30 and 31 will be automatically shifted downwardly and rearwardly with respect to the area 32; and, moreover, the area 30 will be shifted downwardly and rearwardly with respect to the area 31.

Figure 3:
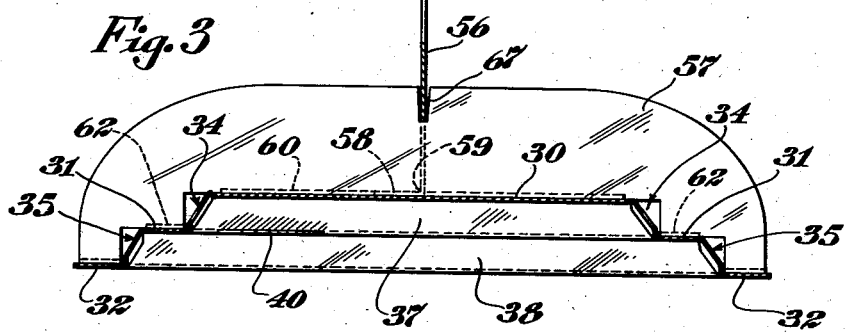
Figure 3 is a cross-sectional view taken substantially along the line 3—3 of Figure 1.

The blank 56 is provided with the cut-out 66, and the blank 57 with the slot 67, so that these two blanks may be frictionally engaged, as shown in Figures 2 and 3, when the device is set up. This firmly retains the parts in their proper relationship until such time as the device is to be again collapsed.

Preferably, the upper edge of the blank 56 is provided with a notch to receive the edge of the panel 39 when the latter is swung into operative position, as shown in Figure 7.

In Figures 10-14, I have illustrated an embodiment of the invention in which the medial display area 70 is substantially circular and is surrounded by the circular border areas 71 and 72. Between the areas 70 and 71 is the annular slitted panel 73; and between the areas 71 and 72 is the similar slitted panel 74.

The device is, as before, constructed from a single blank 75 of sheet material which may embody any desired additional contour, such as that shown, for example, at the bottom of Figure 10. The slits are constructed as hereinbefore described in connection with Figures 8 and 9, except that each slit is not accurately parallel to the slit adjacent to it, by virtue of the fact that the panel is circular instead of straight. Nevertheless, the louvers that ultimately result are substantially parallelogrammic where the slits are of rectilinear, zigzag type.

The prop blank is in this case composed of the two parallel prop portions 76, hinged as at 77 to the portions 78 and 79. The portions 78 and 79 are adhesively secured to the rear of the border area 72.

The bracing blank, corresponding to the blank 57 of Figure 6, is preferably in two parts. One part 80 has the hinged flaps 81, 82, and 83, the flap 81 being adhesively secured to the back of the area 72; the flap 82 being adhesively secured to the back of the area 71; and the flap 83 being adhesively secured to the back of the medial area 70. The hinge axes 84, 85, and 86 are offset with respect to each other, so that when the blank 80 is swung from the collapsed position of Figure 12 to the operative position of Figures 13 and 14, it imparts a rotative shifting movement to the areas 70 and 71 relative to the area 72; and, moreover, it imparts a further rotative shifting movement to the area 70 relative to the border area 71.

In other words, when the device is set up as shown in Figure 13, the hinge axes 84, 85 and 86 are brought into a common, substantially horizontal plane.

The other blank 87 is similarly constructed and arranged, having the flaps 88, 89, and 90 secured, respectively, to the areas 72, 71, and 70, with the hinge axes 91, 92, and 93 offset with respect to each other. It should be noted, however, that in this case the axes are offset in the opposite direction, so that when the blank 87 is swung from the collapsed position of Figure 12 to the operative position of Figures 13 and 14 a rotative shifting movement is effected which has the same directional adjusting effect upon the parts as the blank 80.

By staggering the hinge axes in the opposite direction, a modified device, such as illustrated in Figure 15, results. In this case, the medial area 94 is pushed forwardly with respect to the border areas 95 and 96. In other respects, this modified device is substantially the same as that illustrated in Figure 10, and comprises the slitted panels 97 and 98, the prop blank 99, and the bracing blanks 100 and 101.

In Figures 16-21, I have illustrated a few possible modifications in the mode of forming the slits, showing the different effects which may be produced.

In Figure 16, I have shown a blank 102 provided with a series of rectilinear, zigzag slits in which the end portion 103 of a slit terminates closely adjacent to a midportion of the adjacent slit 104, the other end portion 105 of the slit terminating closely adjacent to a mid-portion of the opposite adjacent slit 106. This divides the slitted area into a series of rectangular portions 107 which define louvers, as shown in Figure 17, when the areas on opposite sides of the slitted panel are shifted into the offset planes shown in Figure 17.

Each louver 107 remains attached to the body of the blank at the relatively small, readily bendable areas 108, and the louvers assume positions in oblique, offset planes.

In Figures 18 and 19, I have shown an arrangement in which the midportion 109 of each slit is substantially transverse to the longitudinal axis of the slitted panel as a whole. The end portions 110 of the slit terminate closely adjacent to midportions of adjacent slits 111 and 112, respectively. Accordingly, when the areas 113 and 114 are adjusted into the offset planes shown in Figure 19, the series of rectangular louvers 115 are produced, each of which is attached and held in position at the relatively small areas 116.

It will be understood that the slit as a whole, in the embodiment of Figures 18 and 19, is diagonal with respect to the slitted panel as a whole notwithstanding the fact that the midportion 109 of each slit is at right angles to the panel. Accordingly, the term "diagonal", as used in the appended claims, is intended to include within its significance a slit of the zigzag variety shown in Figures 18 and 19.

In Figures 20 and 21, I have shown a modified slit essentially similar to the others but curvilinear in character, the typical slit 117 being thus S-shaped. The ends 118 of the slit terminate closely adjacent to midportions of the corresponding adjacent slits 119 and 120, thereby defining the circular or elliptical louvers 121. These louvers are attached to the unslitted areas 122 and 123 at the relatively small, readily bendable areas 124, and assume the spaced positions of Figure 21 when the areas 122 and 123 are shifted into the offset planes shown in Figure 21.

It is within the purview of my invention, where curvilinear slits are provided, to arrange the S-shaped slit either in the upright position shown in Figure 20 or in the inverted position corresponding to the letter S as viewed in a mirror. Also, while the louvers 121 are substantially circular, this is shown merely by way of example, and it will be understood that a variation in the curvature of the slits will produce a substantially elliptical louver of any desired eccentricity. Accordingly, it is intended that the substantially circular louvers of Figures 20 and 21 shall be construed merely as specified examples of an elliptical contour; and the term "elliptical", as used in the appended claims, is intended to include within its scope the type of louvers shown in Figures 20 and 21.

In general, it will be understood that my invention is susceptible of innumerable variations, depending not only upon the shape and arrangement of the slits, but also upon the relative arrangement of a slitted panel or panels with respect to the display device as a whole. Thus, while I have herein illustrated devices in which the slitted panels serve as ornamental border portions for a main display panel, it will be understood that the invention is equally applicable to display devices of widely differing character where, for example, a slitted panel of the present type may be arranged between two equally important unslitted areas.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative and not in a limiting sense.

Having thus described my invention, and illustrated its use, what I claim as new and desire to secure by Letters Patent is—

1. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes.

2. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes; each slit being a zigzag whose ends lie closely adjacent to midportions of the adjacent slits, respectively, whereby the louvers have relatively large midportions secured to said areas only at opposed, relatively small, readily bendable areas.

3. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes; each slit being a rectilinear zigzag whose ends lie closely adjacent to midportions of the adjacent slits, respectively, whereby the louvers are parallelogrammic and are secured to said areas only at opposite corners.

4. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes; each slit being S-shaped with its ends lying closely adjacent to midportions of the adjacent slits, respectively, whereby the louvers are substantially elliptical in contour and are secured to said areas only at opposed, relatively small, readily bendable areas.

5. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes, and means for retaining said areas in said offset relationship.

6. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes, and means for retaining said areas in said offset relationship, said means comprising a prop secured behind one of said areas and adapted to support the display device, and a member hinged to said areas along offset hinge axes and adapted to engage said prop.

7. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes, and collapsible means for effecting said shifting movement, said means comprising a normally flat blank having hinged flaps secured to said areas, respectively, the hinge axes of said flaps being offset from one another.

8. In a knock-down display device of the character described, an integral flat blank of bendable sheet material provided with a medial display area, a border area spaced therefrom, and a slitted panel between said areas, the slitted panel being divided into a series of louvers by spaced slits which permit a shifting movement of the border area relative to the display area to position said areas in offset planes, whereby said louvers assume spaced positions in offset oblique planes.

9. In a knock-down display device of the character described, an integral flat blank of bendable sheet material provided with a medial display area, a border area spaced therefrom, and a slitted panel between said areas, the slitted panel being divided into a series of louvers by spaced slits which permit a shifting movement of the border area relative to the display area to position said areas in offset planes, whereby said louvers assume spaced positions in offset oblique planes, a prop blank hinged to one of said areas and adapted to assume a position transverse to said area so as to support the device in upright position, and a bracing blank hinged to said areas along offset hinge axes and adapted to engage said prop blank to retain said areas in said offset relationship.

10. In a knock-down display device of the character described, an integral flat blank of bendable sheet material provided with a medial display area, a border area spaced therefrom, and a slitted panel between said areas, the slitted panel being divided into a series of louvers by spaced slits which permit a shifting movement of the border area relative to the display area to position said areas in offset planes, whereby said louvers assume spaced positions in offset oblique planes, a prop blank hinged to one of said areas and adapted to assume a position transverse to said area so as to support the device in upright position, and a bracing blank hinged to said areas along offset hinge axes and adapted to engage said prop blank to retain said areas in said offset relationship, said prop blank and bracing blank being foldable into substantially flat, superposed relationship to the first-named blank when the display device is knocked down into collapsed condition.

11. In a knock-down display device of the character described, an integral flat blank of bendable sheet material provided with a substantially rectangular, medial display area, a border area of conforming shape spaced therefrom along two opposite sides of the rectangle, and a pair of slitted panels between said areas along said sides, each slitted panel being divided into a series of louvers by spaced slits which permit a relative shifting movement of the border area in a direction parallel to said sides, whereby said border area and display area assume positions in offset planes with said louvers spaced apart in offset oblique planes.

12. In a knock-down display device of the character described, an integral flat blank of bendable sheet material provided with a substantially rectangular, medial display area, a border area of conforming shape spaced therefrom along two opposite sides of the rectangle, and a pair of slitted panels between said areas along said sides, each slitted panel being divided into a series of louvers by spaced slits which permit a relative shifting movement of the border area in a direction parallel to said sides, whereby said border area and display area assume positions in offset planes with said louvers spaced apart in offset oblique planes, and a panel hinged to said blank and extending between the display area and the border area along one of the remaining sides of the rectangle.

13. In a knock-down display device of the character described, an integral flat blank of bendable sheet material provided with a substantially rectangular, medial display area, a border area of conforming shape spaced therefrom along two opposite sides of the rectangle, and a pair of slitted panels between said areas along said sides, each slitted panel being divided into a series of louvers by spaced slits which permit a relative shifting movement of the border area in a direction parallel to said sides, whereby said border area and display area assume positions in offset planes with said louvers spaced apart in offset oblique planes, a panel integral with said blank and extending between the display area and the border area along one of the remaining sides of the rectangle, and another panel hinged to said blank and adapted to be swung into a position between the display area and the border area along the fourth side of the rectangle.

14. In a knock-down display device of the character described, an integral flat blank of bendable sheet material provided with a substantially circular, medial display area, a border area of conforming shape spaced therefrom, and a slitted panel between said areas, said slitted panel being divided into a series of louvers by spaced slits which permit a relative rotative shifting movement of the border area, whereby said border area and display area assume positions in offset planes with said louvers spaced apart in offset oblique planes.

15. In a knock-down display device of the character described, an integral flat blank of bendable sheet material provided with a substantially circular, medial display area, a border area of conforming shape spaced therefrom, and a slitted panel between said areas, said slitted panel being divided into a series of louvers by spaced slits which permit a relative rotative shifting movement of the border area, whereby said border area and display area assume positions in offset planes with said louvers spaced apart in offset oblique planes, and means for effecting said shifting movement, comprising a normally flat blank having hinged flaps secured to said areas, respectively, the hinge axes of said flaps being offset from one another.

16. In a knock-down display device of the character described, an integral flat blank of bendable sheet material provided with a substantially circular, medial display area, a border area of conforming shape spaced therefrom, and a slitted panel between said areas, said slitted panel being divided into a series of louvers by spaced slits which permit a relative rotative shifting movement of the border area, whereby said border area and display area assume positions in offset planes with said louvers spaced apart in offset oblique planes, and means for effecting said shifting movement, comprising two normally flat blanks each of which has a hinged flap secured to the medial area and another hinged flap secured to the border area, said last-named flaps being diametrically opposed to each other, the hinge axes of the flaps secured to the medial area being offset from the hinge axes of the flaps secured to the border area.

17. In a knock-down display device of the character described, an integral flat blank of bendable sheet material provided with a substantially circular, medial display area, a border area of conforming shape spaced therefrom, an outer border area of conforming shape spaced from the first-named border area, a slitted panel between the display area and the inner border area, and a slitted panel between the inner and outer border areas, each slitted panel being divided into a series of louvers by spaced slits which permit a rotative shifting movement of the border areas relative to the display area and a further rotative shifting movement of the outer border area relative to the inner border area, whereby said border areas and display area assume positions in three offset planes with the louvers of each slitted panel spaced apart in offset oblique planes.

18. In a knock-down display device of the character described, an integral flat blank of bendable sheet material provided with a substantially circircular, medial display area, a border area of conforming shape spaced therefrom, an outer border area of conforming shape spaced from the first-named border area, a slitted panel between the display area and the inner border area, and a slitted panel between the inner and outer border areas, each slitted panel being divided into a series of louvers by spaced slits which permit a rotative shifting movement of the border areas relative to the display area and a further rotative shifting movement of the outer border area relative to the inner border area, whereby said border areas and display area assume positions in three offset planes with the louvers of each slitted panel spaced apart in offset oblique planes, a prop blank hinged to one of said areas and adapted to assume a position transverse to said area so as to support the device in upright position, and at least one bracing blank hinged to said areas along offset hinge axes and adapted to effect said rotative shifting movements when it is swung into a position transverse to said areas, said bracing blank being further adapted to engage said prop blank to retain the areas in offset relationship.

ABRAHAM BECKELMAN.